United States Patent
Jiang et al.

(10) Patent No.: US 11,785,541 B2
(45) Date of Patent: Oct. 10, 2023

(54) METHOD FOR EXECUTING BFR PROCESS, DEVICE, TERMINAL, BASE STATION, AND STORAGE MEDIUM

(71) Applicant: BEIJING XIAOMI MOBILE SOFTWARE CO., LTD., Beijing (CN)

(72) Inventors: Xiaowei Jiang, Beijing (CN); Ming Zhang, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 409 days.

(21) Appl. No.: 17/289,833

(22) PCT Filed: Nov. 1, 2018

(86) PCT No.: PCT/CN2018/113530
§ 371 (c)(1),
(2) Date: Apr. 29, 2021

(87) PCT Pub. No.: WO2020/087469
PCT Pub. Date: May 7, 2020

(65) Prior Publication Data
US 2021/0410062 A1 Dec. 30, 2021

(51) Int. Cl.
| | |
|---|---|
| G08C 17/00 | (2006.01) |
| H04W 52/02 | (2009.01) |
| H04W 76/19 | (2018.01) |
| H04W 76/28 | (2018.01) |
| H04W 72/044 | (2023.01) |
| H04W 72/21 | (2023.01) |

(52) U.S. Cl.
CPC ..... *H04W 52/0216* (2013.01); *H04W 72/044* (2013.01); *H04W 72/21* (2023.01); *H04W 76/19* (2018.02); *H04W 76/28* (2018.02)

(58) Field of Classification Search
CPC . H04W 52/0216; H04W 76/19; H04W 76/28; H04W 72/21; H04W 72/044
See application file for complete search history.

(56) References Cited

U.S. PATENT DOCUMENTS

| | | | |
|---|---|---|---|
| 11,706,081 B2* | 7/2023 | Jiang | H04W 76/28 370/216 |
| 2019/0089579 A1* | 3/2019 | Sang | H04W 36/00837 |
| 2019/0394082 A1* | 12/2019 | Cirik | H04W 24/08 |

* cited by examiner

*Primary Examiner* — Erika A Washington
(74) *Attorney, Agent, or Firm* — COZEN O'CONNOR

(57) ABSTRACT

A method for executing a beam failure recovery (BFR) process includes receiving a delay instruction sent by a base station, in which the delay instruction is configured to instruct that a mechanism for executing a beam failure recovery (BFR) process is configured as a mechanism for delaying the execution of the BFR process when the BFR process is triggered in an inactive state of discontinuous reception (DRX); configuring the mechanism for executing the BFR process of the terminal as the mechanism for delaying the execution of the BFR process when the BFR process is triggered in the inactive state of the DRX based on the delay instruction; and delaying the execution of the BFR process when the BFR process is triggered in the inactive state of the DRX.

20 Claims, 3 Drawing Sheets

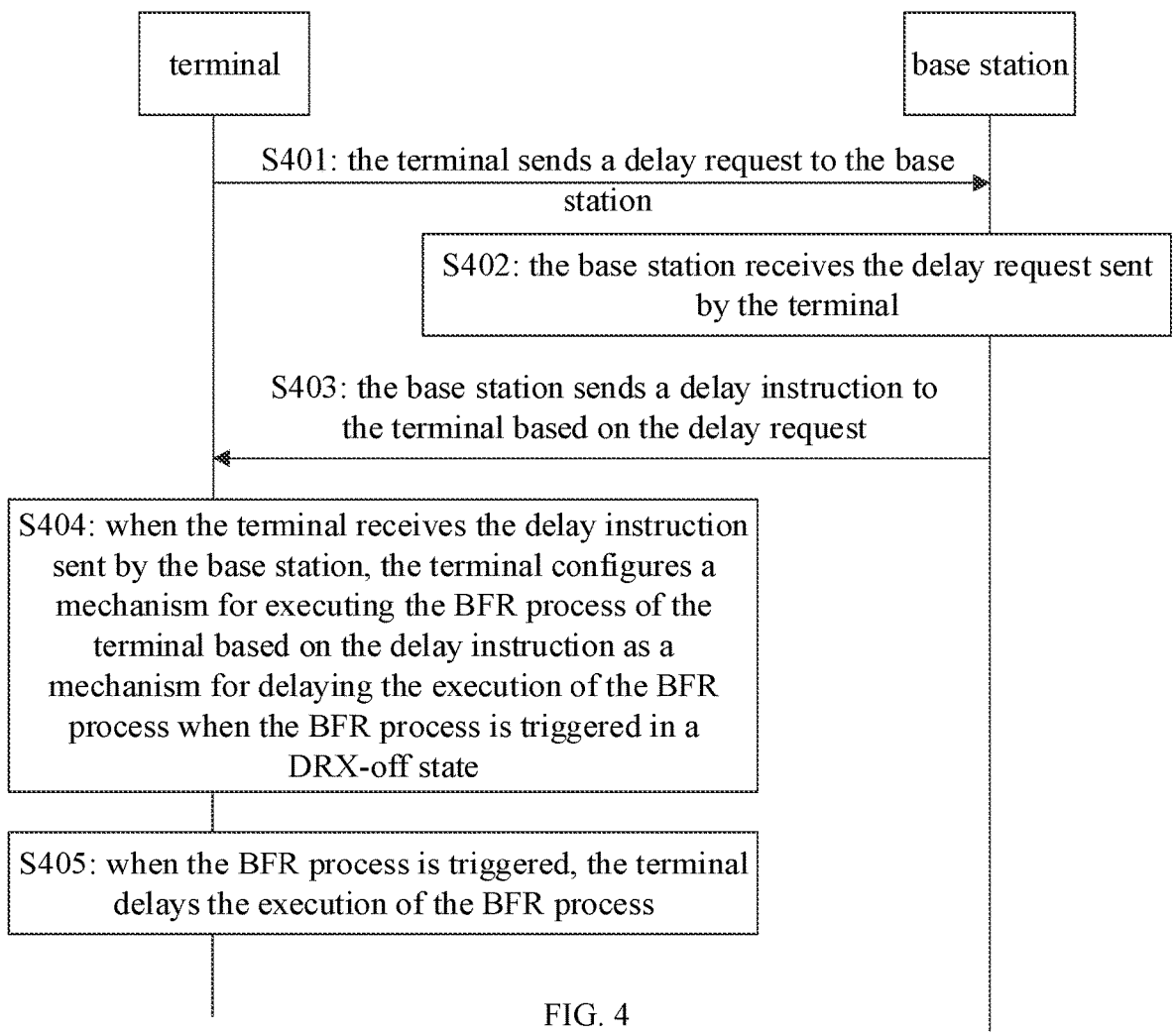
FIG. 4
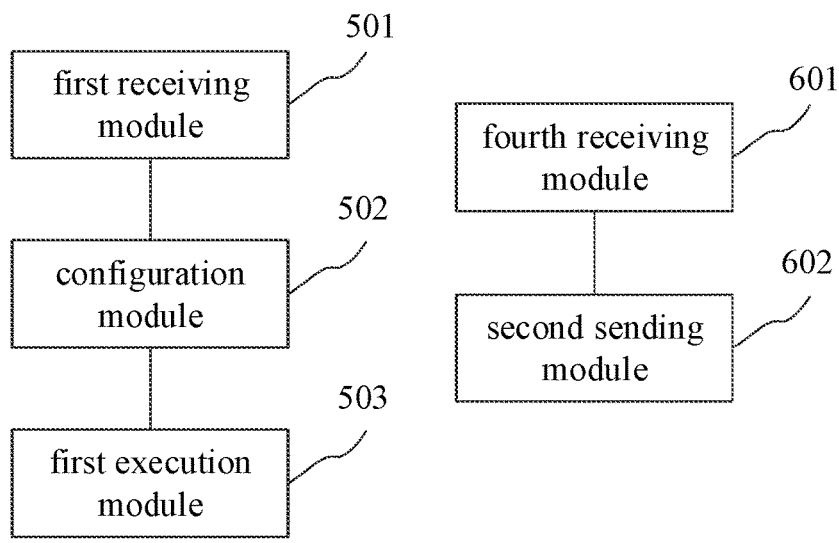
FIG. 5
FIG. 6

METHOD FOR EXECUTING BFR PROCESS, DEVICE, TERMINAL, BASE STATION, AND STORAGE MEDIUM

CROSS-REFERENCE TO RELATED APPLICATION

This application is the U.S. national phase application of International Application No. PCT/CN2018/113530, filed on Nov. 1, 2018, the entire contents of which are incorporated herein by reference as if set forth in its entirety.

TECHNICAL FIELD

The present disclosure relates to the field of wireless communication technology, and more particularly to a method, an apparatus, a terminal and a base station for executing a BFR process, and a storage medium.

BACKGROUND

The beam forming technology is a key technology in the fifth-generation (5G) mobile communication system. Generally, when a base station communicates with a terminal through the beam forming technology, the better the beam alignment between the base station and the terminal, the greater the signal gain provided by the beam. However, in a millimeter wave system, the factors such as a sudden channel fluctuation, an unexpected obstacle interruption, a terminal rotation may result in a beam misalignment between the terminal and the base station and a beam failure may occur. Therefore, the terminal needs to monitor the beam signal quality. When the beam signal quality is detected to be poor, it is determined that the beam has failed. When the terminal has a beam failure, the physical layer of the terminal will indicate the beam failure to the media access control (MAC) layer, and the MAC layer will trigger a beam failure recovery (BFR). After the terminal executes the BFR process, the base station will configure a new beam for the terminal, in which the BFR process is executed based on a random access process.

However, a discontinuous reception (DRX) mechanism is often used in the data transmission between the terminal and the base station. This mechanism allows the terminal to periodically enter into an inactive state of the DRX at certain times instead of monitoring physical downlink control channel (PDCCH) subframes, and to switch from an inactive state of the DRX to an active state of the DRX (i.e., DRX-on state) if it is needed to monitor. In the related art, in order to save power consumption, the terminal will delay the execution of all the BFR processes in the inactive state of the DRX.

In the related art, the terminal may delays the execution of all the BFR processes in the inactive state of DRX for a long time, so that the base station cannot schedule downlink data in time.

SUMMARY

According to a first aspect of the present disclosure, a method for executing a BFR process is provided. The method includes: receiving by a terminal, a delay instruction sent by a base station. The delay instruction is configured to instruct that a mechanism for executing a beam failure recovery (BFR) process is configured as a mechanism for delaying the execution of the BFR process when the BFR process is triggered in an inactive state of discontinuous reception (DRX). The method may also include configuring by the terminal, the mechanism for executing the BFR process of the terminal as the mechanism for delaying the execution of the BFR process when the BFR process is triggered in the inactive state of the DRX based on the delay instruction. The method may also include delaying by the terminal, the execution of the BFR process when the BFR process is triggered in the inactive state of the DRX.

According to a second aspect of the present disclosure, a method for executing a BFR process is provided. The method includes: receiving by a base station, a delay request sent by a terminal. The delay request is configured to request the base station to configure a mechanism for executing a beam failure recovery (BFR) process of the terminal as a mechanism for delaying the execution of the BFR process when the BFR process is triggered in an inactive state of discontinuous connection (DRX). The method may also include sending by the base station, a delay instruction to the terminal based on the delay request. The delay instruction is configured to instruct the terminal to configure the mechanism for executing the BFR process as the mechanism for delaying the execution of the BFR process when the BFR process is triggered in the inactive state of the DRX.

According to a third aspect of the present disclosure, a terminal is provided. The terminal includes a processor and a memory for storing instructions executable by the processor. The processor is configured to receive a delay instruction sent by a base station. The delay instruction is configured to instruct that a mechanism for executing a beam failure recovery (BFR) process is configured as a mechanism for delaying the execution of the BFR process when the BFR process is triggered in an inactive state of discontinuous reception (DRX). The processor may also be configured to configure the mechanism for executing the BFR process of the terminal as the mechanism for delaying the execution of the BFR process when the BFR process is triggered in the inactive state of the DRX based on the delay instruction. The processor may also be configured to delay the execution of the BFR process when the BFR process is triggered in the inactive state of the DRX.

It should be understood that the above general description and the following detailed description are only exemplary and explanatory, which cannot limit the present disclosure.

BRIEF DESCRIPTION OF THE DRAWINGS

The drawings herein are incorporated into the specification and constitute a part of the specification, show embodiments in accordance with the present disclosure, and are used to explain the principle of the present disclosure together with the specification.

FIG. 4 is a flow chart illustrating a method for executing a BFR process according to an exemplary embodiment.

FIG. 5 is a block diagram illustrating an apparatus for executing a BFR process according to an exemplary embodiment.

FIG. 6 is a block diagram illustrating an apparatus for executing a BFR process according to an exemplary embodiment.

DETAILED DESCRIPTION

In order to make the objectives, technical solutions, and advantages of the present disclosure clearer, the embodiments of the present disclosure are described in detail below with reference to the accompanying drawings.

The exemplary embodiments will be described in detail here, and examples thereof are illustrated in the accompanying drawings. When the following descriptions refer to the accompanying drawings, unless otherwise indicated, the same numbers in different drawings represent the same or similar elements. The implementations described in the following exemplary embodiments do not represent all implementations consistent with the present disclosure. Rather, they are merely examples of apparatuses and methods consistent with some aspects of the present disclosure.

Figure 1:
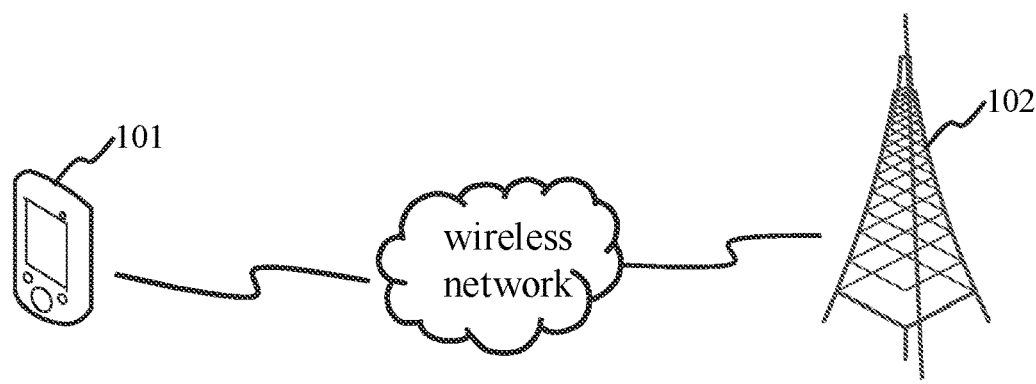
FIG. 1 is a schematic diagram of a system architecture involved in a method for executing a BFR process according to some exemplary embodiments of the present disclosure.

FIG. 1 is a schematic diagram of a system architecture involved in a method for executing a BFR process according to some exemplary embodiments of the present disclosure. The system architecture includes a terminal 101 and a base station 102. The terminal 101 and the base station 102 may be connected through a wireless network. The system architecture is that of 5G NR. The terminal 101 may be a handheld device (such as a mobile phone terminal) with a wireless communication function, a vehicle-mounted device, a wearable device, a computing device, or other processing device connected to a wireless modem. The terminal 101 is not limited in detail in the embodiments of the present disclosure.

The base station 102 may configure the terminal 101 to monitor a signal quality of a group of beams for a serving cell of the terminal 101. The base station 102 includes at least one main cell group (MCG) or at least one secondary cell group (SCG). Therefore, the serving cell may be a cell located in the MCG or SCG If the beam signal quality currently monitored does not meet certain requirements, a physical layer of the terminal 101 will indicate a beam failure to an MAC layer. After the physical layer indicates the beam failure to the MAC layer for a certain number of times, the MAC layer will trigger and execute a beam failure recovery (BFR) process. Then the base station 102 may configure the terminal 101 to monitor a new group of beams after the BFR process is executed by the terminal 101.

However, a discontinuous reception (DRX) mechanism is often used in the data transmission between the terminal 101 and the base station 102. This mechanism allows the terminal 101 to periodically enter into an inactive state of the DRX at certain times instead of monitoring PDCCH subframes, and to switch from the inactive state of the DRX to a DRX-on state if it is needed to monitor. In this way, the purpose of saving power consumption of the terminal 101 can be achieved In the embodiments of the present disclosure, the base station 102 may perform a configuration for the terminal 101 that, the terminal 101 delays the execution of the BFR process in the inactive state of the DRX only when the base station 102 allows the terminal 101 to delay. The process may be that, the terminal 101 receives a delay instruction sent by the base station 102, and a mechanism for executing the BFR process by the terminal 101 is configured based on the delay instruction as a mechanism for delaying the execution of the BFR process when the BFR process is triggered in the inactive state of the DRX. Under the mechanism of delaying the execution of the BFR process, the execution of the BFR process is delayed when the BFR process is triggered in the inactive state of the DRX.

The base station 102 may perform this configuration for those terminals 101 that do not have delay-sensitive services, so that power consumption for these terminals 101 can be saved. This configuration is not performed for those terminals 101 with delay-sensitive services, so that those terminals with delay-sensitive services can immediately execute the BFR process, and the base station 102 can immediately schedule downlink data for those terminals 101 after the DRX-on of the terminals 101 arrives, thereby improving the efficiency of data transmission.

Figure 2:
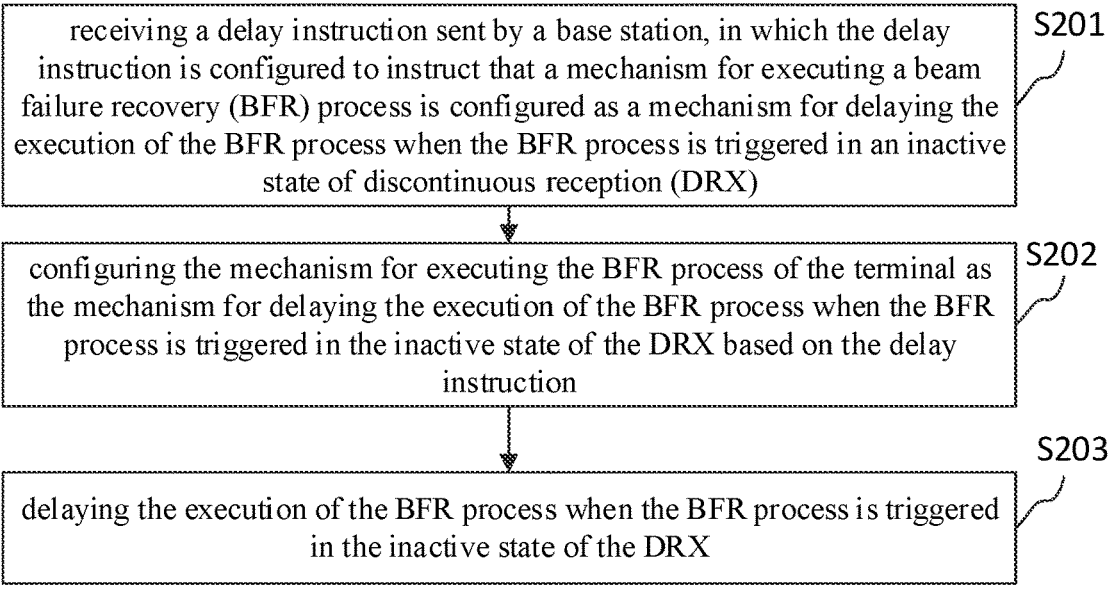
FIG. 2 is a flow chart illustrating a method for executing a BFR process according to an exemplary embodiment.

FIG. 2 is a flow chart illustrating a method for executing a BFR process according to an exemplary embodiment. The method is applicable to a terminal. As illustrated in FIG. 2, the method for executing the BFR process may include the following actions in blocks S201-S203.

In block S201, a delay instruction sent by a base station is received, in which the delay instruction is configured to instruct that a mechanism for executing a beam failure recovery (BFR) process is configured as a mechanism for delaying the execution of the BFR process when the BFR process is triggered in an inactive state of discontinuous reception (DRX).

In block S202, the mechanism for executing the BFR process of the terminal is configured as the mechanism for delaying the execution of the BFR process when the BFR process is triggered in the inactive state of DRX based on the delay instruction.

In block S203, the execution of the BFR process is delayed when the BFR process is triggered in the inactive state of DRX.

In a possible implementation, delaying the execution of the BFR process includes: determining a first timing when the DRX switches from the inactive state to an active state, and determining a second timing before the first timing based on the first timing, an interval between the first timing and the second timing being a specified duration; and delaying the execution of the BFR process to the second timing.

In a possible implementation, before determining the first timing when the DRX switches from the inactive state to the active state, the method further includes: receiving an interval configuration instruction sent by the base station, and obtaining the specified duration from the interval configuration instruction.

In a possible implementation, before delaying the execution of the BFR process to the second timing, the method further includes: when an uplink scheduling request (SR) is not triggered before the second timing, executing a step of delaying the execution of the BFR process to the second timing; when the SR is triggered before the second timing, immediately executing the BFR process.

In a possible implementation, before delaying the execution of the BFR process to the second timing, the method further includes: when a random access process is not triggered before the second timing, executing a step of delaying the execution of the BFR process to the second timing; and when the random access process is triggered before the second timing, immediately executing the BFR process.

In a possible implementation, before delaying the execution of the BFR process, the method further includes: detecting whether the terminal is currently in a long-period inactive state; and executing a step of delaying the execution of the BFR process when the terminal is currently in the long-period inactive state.

In a possible implementation, before detecting whether the terminal is currently in a long-period inactive state, the method further includes: receiving a condition execution instruction sent by the base station. The condition execution instruction is configured to instruct to detect whether the terminal is currently in the long-period inactive state.

In a possible implementation, before determining whether the delay instruction sent by the base station is received, the method further includes: sending a delay request to the base station. The delay request is configured to request the base station to configure the mechanism for executing the terminal's BFR process as the mechanism for delaying the execution of the BFR process when the BFR process is triggered in the inactive state of the DRX.

In a possible implementation, the delay instruction is configured by the base station for a main cell group (MCG) to the terminal, and/or is configured by the base station for a secondary cell group (SCG) to the terminal.

In the embodiments of the present disclosure, the terminal receives the delay instruction sent by the base station; based on the delay instruction, the mechanism for executing the BFR process of the terminal is configured as the mechanism for delaying the execution of the BFR process when the BFR process is triggered in the inactive state of the DRX based on the delay instruction; when the BFR process is triggered in the inactive state of the DRX, the terminal delays the execution of the BFR process. Since the base station configures the mechanism for executing the BFR process of the terminal, the terminal delays the execution of the BFR process only when the base station allows the terminal to delay the execution of the BFR process. In this way, the base station can schedule downlink data in time for the terminal without configuration of delaying the execution of the BFR process, thereby improving the efficiency of data transmission.

Figure 3:
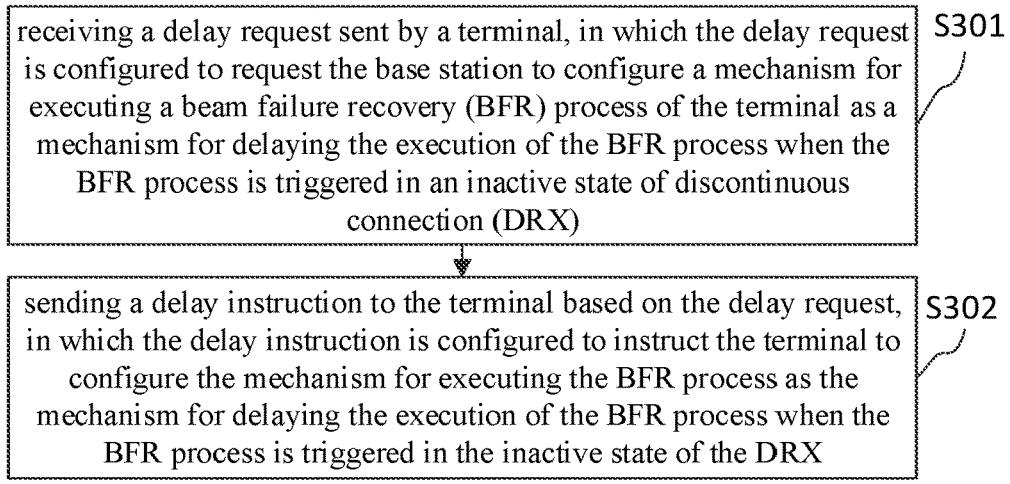
FIG. 3 is a flow chart illustrating a method for executing a BFR process according to an exemplary embodiment.

FIG. 3 is a flow chart illustrating a method for executing a BFR process according to an exemplary embodiment. The method is applicable to a base station. As illustrated in FIG. 3, the method for executing the BFR process may include the following actions in blocks S301-S302.

In block S301, a delay request sent by a terminal is received. The delay request is configured to request the base station to configure a mechanism for executing a beam failure recovery (BFR) process of the terminal as a mechanism for delaying the execution of the BFR process when the BFR process is triggered in an inactive state of discontinuous connection (DRX).

In block S302, a delay instruction is sent to the terminal based on the delay request. The delay instruction is configured to instruct the terminal to configure the mechanism for executing the BFR process as the mechanism for delaying the execution of the BFR process when the BFR process is triggered in the inactive state of the DRX.

In a possible implementation, the delay request carries the current network auxiliary information of the terminal. Sending the delay instruction to the terminal based on the delay request includes: judging whether the terminal has a delay-sensitive service currently based on the network auxiliary information, in which the delay-sensitive service includes a service having a delay requirement lower than a preset duration; and sending the delay instruction to the terminal when the terminal does not have the delay-sensitive service currently.

In a possible implementation, the method further includes: sending an interval configuration instruction to the terminal. The interval configuration instruction carries a specified duration, and the specified duration is an interval between a first timing when the DRX for the terminal switches from the inactive state to an active state and a second timing when the BFR process is executed. The second timing is before the first timing.

In a possible implementation, the method further includes: sending a condition execution instruction to the terminal. The condition execution instruction is configured to instruct to detect whether the terminal is currently in a long-period inactive state.

In the embodiments of the present disclosure, the base station sends the delay instruction to the base station based on the delay request sent by the terminal. The terminal receives the delay instruction sent by the base station, and configures the mechanism for executing the BFR process of the terminal based on the delay instruction as the mechanism for delaying the execution of the BFR process when the BFR process is triggered in the inactive state of the DRX. When the BFR process is triggered in the inactive state of the DRX, the terminal delays the execution of the BFR process. Since the base station configures the mechanism for executing the BFR process of the terminal, the terminal delays the execution of the BFR process only when the base station allows the terminal to delay the execution of the BFR process. In this way, the base station can schedule downlink data in time for the terminal without configuration of delaying the execution of the BFR process, thereby improving the efficiency of data transmission.

FIG. 4 is a flow chart illustrating a method for executing a BFR process according to an exemplary embodiment. As illustrated in FIG. 4, the method for executing the BFR process may include the following steps.

At step S401, the terminal sends a delay request to the base station.

The delay request is configured to request the base station to configure a mechanism for executing the BFR process of the terminal as a mechanism for delaying the execution of the BFR process when the BFR process is triggered in the inactive state of the DRX. The delay request carries a terminal identifier of the terminal. In order to facilitate the base station to determine whether to configure the mechanism for executing the BFR process of the terminal as the mechanism for delaying the execution of the BFR process when the BFR process is triggered in the inactive state of the DRX based on the delay request, the delay request may also carry current network auxiliary information of the terminal.

In a possible implementation, after the BFR process is triggered, the terminal can directly send a delay request to the base station, or the terminal can first determine whether it is expected to delay the execution of the BFR process and then sends the delay request to the base station only when it is expected to delay the execution of the BFR process. When it is not expected to delay the execution of the BFR process, the terminal does not send the delay request to the base station. The terminal determines whether it is expected to delay the execution of the BFR process by judging whether energy saving is expected. When the terminal expects energy saving, it is determined that the terminal expects to delay the execution of the BFR process. When the terminal does not expect energy saving, it is determined that the terminal does not expect to delay the execution of the BFR process.

In step S402, the base station receives the delay request sent by the terminal.

In step S403, the base station sends a delay instruction to the terminal based on the delay request.

In a possible implementation, the base station directly sends a delay instruction to the terminal after receiving the delay request.

In another possible implementation, the delay request carries current network auxiliary information of the terminal, and the base station determines whether the terminal has a delay-sensitive service currently based on the network auxiliary information. When the terminal does not have the delay-sensitive service currently, the base station sends the delay instruction to the terminal. When the terminal has the delay-sensitive service currently, the base station does not send the delay instruction to the terminal, or the base station sends an execution instruction to the terminal. The delay-sensitive service is a service whose delay requirement is lower than a first preset duration. The delay instruction may be a radio resource control (RRC) signaling, an MAC control element (MAC CE) signaling, or a physical downlink control channel (PDCCH) signaling.

The first preset duration may be set and changed as required. In the embodiments of the present disclosure, the first preset duration is not limited in detail. For example, the first preset duration may be 20 ms or 30 ms.

It should be noted that the delay instruction may be configured separately for the MCG and SCG Each CG group network may configure separately for a UE that supports dual connectivity with both MCG and SCG Correspondingly, the delay instruction is configured by the base station for the MCG to the terminal, and/or is configured by the base station for the SCG to the terminal.

In step S404, when the terminal receives the delay instruction sent by the base station, the terminal configures a mechanism for executing the BFR process of the terminal based on the delay instruction as a mechanism for delaying the execution of the BFR process when the BFR process is triggered in the inactive state of the DRX.

Within a second preset time period after the terminal sends the delay request to the base station, when the delay instruction sent by the base station is received, the terminal configures the mechanism for executing the BFR process of the terminal as the mechanism for delaying the execution of the BFR process when the BFR process is triggered in the inactive state of the DRX based on the delay instruction. When the delay instruction sent by the base station is not received, the terminal configures the mechanism for executing the BFR process of the terminal as a mechanism for immediately executing the BFR process when the BFR process is triggered in the inactive state of the DRX.

The second preset duration may be set and changed as required. In the embodiment of the present disclosure, the second preset duration is not limited in detail. For example, the second preset duration may be 100 ms, 200 ms, 300 ms, etc.

In a possible implementation, in step S403, when the base station determines that the terminal has the delay-sensitive service currently, the base station sends an execution instruction to the terminal. Correspondingly, this step S404 may be: when the terminal receives the execution instruction, the terminal configures the mechanism for executing the BFR process of the terminal as the mechanism for immediately executing the BFR process when the BFR process is triggered in the inactive state of the DRX.

In step S405, when the BFR process is triggered, the terminal delays the execution of the BFR process.

When the BFR process is triggered, the terminal determines whether it is in the inactive state of DRX currently.

When the terminal is in the inactive state of the DRX currently, the terminal delays the execution of the BFR process. When the terminal is not in the inactive state of the DRX currently (that is, in the DRX-on state), the terminal immediately executes the BFR process.

In a first implementation, when the terminal delays the execution of the BFR process, the terminal may execute the BFR process at any timing after the BFR process is triggered. The terminal may execute the BFR process at any timing before the DRX switches from the inactive state to the active state, and may also execute the BFR process at any timing after the DRX switches from the inactive state to the active state.

In a second implementation, the terminal may execute the BFR process at a timing before a specified duration before the DRX is in a next active state. When the terminal executes the BFR process at the timing before the specified duration before the DRX is in the next active state, the terminal may delays the execution of the BFR process by implementing the following steps (1) to (2).

(1) The terminal determines a first timing when the DRX switches from the inactive state to the active state, and determines a second timing before the first timing based on the first timing. An interval between the first timing and the second timing is taken as a specified duration.

The specified duration may be a default duration of a terminal system, or may be a duration configured by the base station. When the specified duration is the duration configured by the base station, the base station may configure the specified duration when the terminal triggers the BFR process, or the base station may configure the specified duration before the terminal triggers the BFR process. The step of configuring the specified duration by the base station may be implemented through the following steps (1-1) to (1-3).

(1-1) The base station sends an interval configuration instruction to the terminal. The interval configuration instruction carries a specified duration. The interval configuration instruction may be the RRC signaling, the MAC CE signaling, or the PDCCH signaling.

(1-2) The terminal receives the interval configuration instruction sent by the base station.

(1-3) The terminal obtains the specified duration from the interval configuration instruction.

The specified duration may be set and changed as required. In the embodiment of the present disclosure, the specified duration is not limited in detail. For example, the specified duration may be 2 ms, 2.5 ms, 5 ms, and so on.

(2) The terminal delays the execution of the BFR process to the second timing.

For example, when the first timing is $T_1$ and the specified duration is 2 ms, the second timing is $T_2$ being 2 ms before $T_1$.

In a possible implementation, when the second timing is determined by the terminal, the BFR process may be directly delayed to execute at the second timing. In another possible implementation, the terminal delays the execution of the BFR process to the second timing only when the terminal does not trigger an uplink scheduling request (SR). Correspondingly, the terminal determines whether the SR is triggered before the second timing before it delays the execution of the BFR process to the second timing. When the SR is not triggered before the second timing, the terminal delays the execution of the BFR process to the second timing. When the SR is triggered before the second timing, the terminal immediately executes the BFR process.

In another possible implementation, the same is true for a random access process. The terminal delays the execution of the BFR process to the second timing only when the random access process is not triggered.

Correspondingly, the terminal determines whether the random access process is triggered before the second timing before it delays the execution of the BFR process to the second timing. When the random access process is not triggered before the second timing, the terminal delays the execution of the BFR process to the second timing. When the random access process is triggered before the second timing, the terminal immediately executes the BFR process.

In a possible implementation, as long as the mechanism for executing the current BFR process is to delay the execution of the triggered BFR process in the inactive state of the DRX, and when the terminal triggers the BFR process in the inactive state of the DRX currently, the terminal will delay the execution of the BFR process. In another possible implementation, the terminal delays the execution of the BFR process only when the terminal is in a long-period inactive (a long DRX-off) state. Correspondingly in step S405, the terminal also detects whether it is in the long-period inactive state currently before the terminal delays the execution of the BFR process. The terminal delays the execution of the BFR process when it is in the long-period inactive state currently. The terminal immediately executes the BFR process when it is not in the long-period inactive state currently.

It should be also noted that, whether the terminal is in the long-period inactive state currently to delay the execution of the BFR process may be configured by the terminal itself, or may be configured by the base station. In addition, when whether the terminal is in the long-period inactive state currently to delay the execution of the BFR process is configured by the base station, the base station may configure it when or before the terminal triggers the BFR process. In the embodiments of the present disclosure, configuration timing of the base station is not limited in detail.

The configuring process that the base station configures whether the terminal is in the long-period inactive state currently to delay the execution of the BFR process may include: the base station sends a condition execution instruction to the terminal, the condition execution instruction being configured to instruct the terminal to detect whether it is in the long-period inactive state currently; the terminal receives the condition execution instruction sent by the base station and detects whether it is in the long-period inactive state currently based on the condition execution instruction.

The condition execution instruction may be the RRC signaling, the MAC CE signaling, or the PDCCH signaling.

It should be noted that, the present disclosure does not specifically limit the order in which the base station sends the interval configuration instruction and the condition execution instruction. The base station may first send the interval configuration instruction, then send the condition execution instruction. The base station may also first send the condition execution instruction, and send the interval configuration instructions. The base station may also send the interval configuration instruction and the condition execution instruction at the same time. Correspondingly, the condition execution instruction and the interval configuration instruction may be carried in one communication instruction, saving instruction resources.

In the embodiment of the present disclosure, the terminal receives the delay instruction sent by the base station, and configures the mechanism for executing the BFR process of the terminal based on the delay instruction as the mechanism for delaying the execution of the BFR process when the BFR process is triggered in the inactive state of the DRX. When the BFR process is triggered in the inactive state of the DRX, the terminal delays the execution of the BFR process. Since the base station configures the mechanism for executing the BFR process of the terminal, the terminal delays the execution of the BFR process only when the base station allows the terminal to delay the execution of the BFR process. In this way, the base station can control the terminal, thereby saving the power consumption of the terminal in the inactive state of the DRX through the delayed execution of the BFR process configured by the base station.

FIG. 5 is a block diagram illustrating an apparatus for executing a BFR process according to an exemplary embodiment. The apparatus is applicable to a terminal and is used to execute the steps executed by the terminal in the above methods. Referring to FIG. 5, the apparatus includes a first receiving module 501, a configuration module 502 and a first execution module 503.

The first receiving module 501 is configured to receive a delay instruction sent by a base station. The delay instruction is configured to instruct that a mechanism for executing a beam failure recovery (BFR) process is configured as a mechanism for delaying the execution of the BFR process when the BFR process is triggered in an inactive state of discontinuous reception (DRX).

The configuration module 502 is configured to configure the mechanism for executing the BFR process of the terminal as the mechanism for delaying the execution of the BFR process when the BFR process is triggered in the inactive state of the DRX based on the delay instruction.

The first execution module 503 is configured to delay the execution of the BFR process when the BFR process is triggered in the inactive state of the DRX.

In a possible implementation, the first execution module 503 is further configured to determine a first timing when the DRX switches from the inactive state to an active state, and determine a second timing before the first timing based on the first timing; and delay the execution of the BFR process to the second timing. An interval between the first timing and the second timing is a specified duration.

In a possible implementation, the apparatus further includes a second receiving module.

The second receiving module is configured to receive an interval configuration instruction sent by the base station, and obtain the specified duration from the interval configuration instruction.

In a possible implementation, the apparatus further includes a second execution module.

The first execution module 503 is further configured to delay the BFR process to be executed at the second timing when the random access process is not triggered before the second timing.

The second execution module is configured to execute the BFR process immediately when the random access process is triggered before the second timing.

In a possible implementation, the apparatus further includes a third execution module.

The first execution module 503 is further configured to delay the execution of the BFR process to the second timing when a random access process is not triggered before the second timing.

The third execution module is configured to execute the BFR process immediately when the random access process is triggered before the second timing.

In a possible implementation, the apparatus further includes a detection module.

The detection module is configured to detect whether the terminal is in a long-period inactive state currently.

The first execution module 503 is further configured to delay the execution of the BFR process when the terminal is in the long-period inactive state currently.

In a possible implementation, the apparatus further includes a third receiving module.

The third receiving module is configured to receive a condition execution instruction sent by the base station. The condition execution instruction is configured to instruct the terminal to detect whether it is in a long-period inactive state currently.

In a possible implementation, the apparatus further includes a first sending module.

The first sending module is configured to send a delay request to the base station. The delay request is configured to request the base station to the mechanism for executing the BFR process of the terminal as the mechanism for delaying the execution of the BFR process when the BFR process is triggered in the inactive state of the DRX.

In a possible implementation, the delay instruction is configured by the base station for a main cell group (MCG) to the terminal, and/or is configured by the base station for a secondary cell group (SCG) to the terminal.

In the embodiments of the present disclosure, the terminal receives the delay instruction sent by the base station, and configures the mechanism for executing the BFR process of the terminal based on the delay instruction as the mechanism for delaying the execution of the BFR process when the BFR process is triggered in the inactive state of the DRX. When the BFR process is triggered in the inactive state of the DRX, the terminal delays the execution of the BFR process. Since the base station configures the mechanism for executing the BFR process of the terminal, the terminal delays the execution of the BFR process only when the base station allows the terminal to delay the execution of the BFR process. In this way, the base station can schedule downlink data in time for the terminal without configuration of delaying the execution of the BFR process, thereby improving the efficiency of data transmission.

FIG. 6 is a block diagram illustrating an apparatus for executing a BFR process according to an exemplary embodiment. The apparatus is applicable to a base station and is used to execute the steps executed by the base station in the above methods for executing the BFR process. Referring to FIG. 6, the apparatus includes a fourth receiving module 601 and a second sending module 602.

The fourth receiving module 601 is configured to receive a delay request sent by a terminal. The delay request is configured to request the base station to configure a mechanism for executing a beam failure recovery (BFR) process of the terminal as a mechanism for delaying the execution of the BFR process when the BFR process is triggered in an inactive state of discontinuous connection (DRX).

The second sending module 602 is configured to send a delay instruction to the terminal based on the delay request. The delay instruction is configured to instruct the terminal to configure the mechanism for executing the BFR process as the mechanism for delaying the execution of the BFR process when the BFR process is triggered in the inactive state of the DRX.

In a possible implementation, the delay request carries current network auxiliary information of the terminal.

The second sending module 602 is further configured to judge whether the terminal has a delay-sensitive service currently based on the network auxiliary information and send the delay instruction to the terminal when the terminal does not have the delay-sensitive service currently. The delay-sensitive service is a service whose delay requirement is lower than a preset duration.

In a possible implementation, the apparatus further includes a third sending module.

The third sending module is configured to send an interval configuration instruction to the terminal. The interval configuration instruction carries a specified duration. The specified duration is an interval between a first timing when the DRX for the terminal switches from the inactive state to an active state and a second timing when the BFR process is executed, the second timing being before the first timing.

In a possible implementation, the apparatus further includes a fourth sending module.

The fourth sending module is configured to send a condition execution instruction to the terminal, in which the condition execution instruction is configured to instruct to detect whether the terminal is in a long-period inactive state currently.

In the embodiments of the present disclosure, the terminal receives the delay instruction sent by the base station, and configures the mechanism for executing the BFR process of the terminal based on the delay instruction as the mechanism for delaying the execution of the BFR process when the BFR process is triggered in the inactive state of the DRX. When the BFR process is triggered in the inactive state of the DRX, the terminal delays the execution of the BFR process. Since the base station configures the mechanism for executing the BFR process of the terminal, the terminal delays the execution of the BFR process only when the base station allows the terminal to delay the execution of the BFR process. In this way, the base station can schedule downlink data in time for the terminal without configuration of delaying the execution of the BFR process, thereby improving the efficiency of data transmission.

It should be noted that, when the apparatuses for executing the BFR process provided in the above embodiments execute the BFR process, the division of the above-described functional modules is only used as an example for illustration. In actual applications, the above-described functions can be allocated to different functional modules according to needs, that is, the internal structure of the apparatus is divided into different functional modules to complete all or part of the functions described above. In addition, the apparatus for executing the BFR process provided in the above embodiments belongs to the same concept as the method for executing the BFR process in the above embodiments. For the specific implementation, please refer to the method embodiments, which will not be repeated here.

Figure 7:
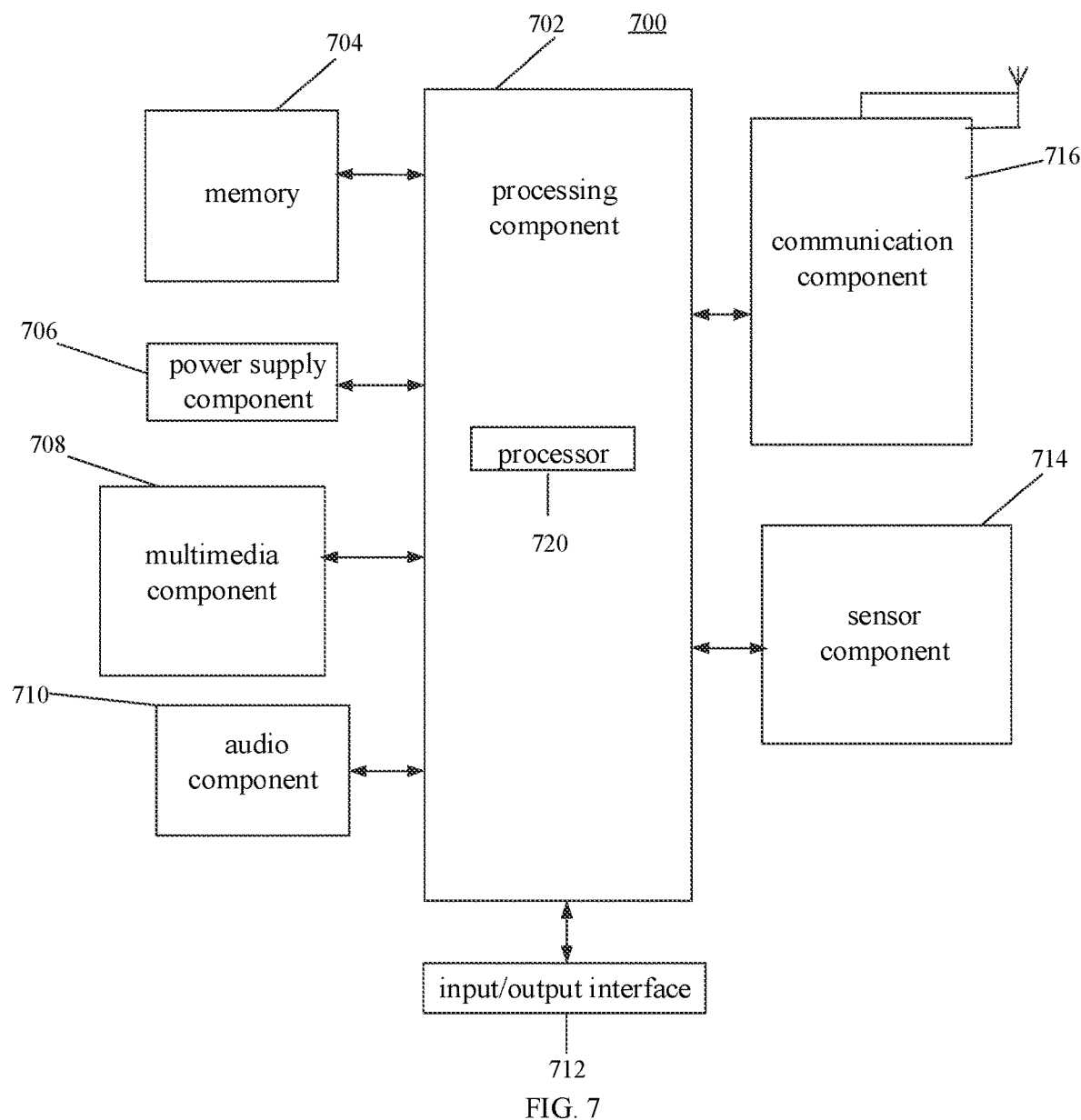
FIG. 7 is a block diagram illustrating a terminal according to an exemplary embodiment.

FIG. 7 is a block diagram illustrating a terminal 700 for executing a BFR process according to an exemplary embodiment. For example, the terminal 700 may be a mobile phone, a computer, a digital broadcasting terminal, a messaging device, a game console, a tablet device, a medical device, a fitness device, a personal digital assistant, etc.

Referring to FIG. 7, the terminal 700 may include one or more of the following components: a processing component 702, a memory 704, a power supply component 706, a multimedia component 708, an audio component 710, an input/output (I/O) interface 712, a sensor component 714, and a communication component 716.

The processing component 702 typically controls the overall operations of the terminal 700, such as the operations associated with display, telephone calls, data communications, camera operations, and recording operations. The processing component 702 may include one or more processors 720 to execute instructions to perform all or part of the steps of the above described method. In addition, the processing component 702 may include one or more modules which facilitate the interaction between the processing component 702 and other components. For example, the processing component 702 may include a multimedia module to facilitate the interaction between the multimedia component 708 and the processing component 702.

The memory 704 is configured to store various types of data to support operations in the terminal 700. Examples of such data include instructions for any application or method operated on the terminal 700, contact data, phone book data, messages, pictures, videos, and so on. The memory 704 may be implemented by any type of volatile or nonvolatile storage device or a combination thereof, such as a static random access memory (SRAM), an electrically erasable programmable read-only memory (EEPROM), an erasable programmable read only memory (EPROM), a programmable read only memory (PROM), a read only memory (ROM), a magnetic memory, a flash memory, a magnetic or optical disk.

The power supply component 706 provides power to various components of the terminal 700. The power supply component 706 may include a power management system, one or more power supplies, and other components associated with the generation, management, and distribution of power for the terminal 700.

The multimedia component 708 includes a screen that provides an output interface between the terminal 700 and the user. In some embodiments, the screen may include a liquid crystal display (LCD) and a touch panel (TP). If the screen includes a touch panel, the screen may be implemented as a touch screen to receive input signals from the user. The touch panel includes one or more touch sensors to sense touches, swipes, and gestures on the touch panel. The touch sensors may not only sense a boundary of the touch or slide action, but also sense a period of time and a pressure associated with the touch or swipe action. In some embodiments, the multimedia component 708 includes a front camera and/or a rear camera. When the terminal 700 is in an operation mode, such as a shooting mode or a video mode, the front camera and/or the rear camera may receive external multimedia data. Each of the front camera and rear camera may be a fixed optical lens system or have focal length and optical zoom capabilities.

The audio component 710 is configured to output and/or input audio signals. For example, the audio component 710 includes a microphone (MIC), and when the terminal 700 is in an operation mode, such as a call mode, a recording mode, and a voice recognition mode, the microphone is configured to receive external audio signals. The received audio signal can be further stored in the memory 704 or sent via the communication component 716. In some embodiments, the audio component 710 further includes a speaker for outputting audio signals.

The I/O interface 712 provides an interface between the processing component 702 and a peripheral interface module. The above-mentioned peripheral interface module may be a keyboard, a click wheel, a button, and the like. These buttons may include but are not limited to, a home button, a volume button, a starting button, and a locking button.

The sensor component 714 includes one or more sensors for providing the terminal 700 with various aspects of state evaluation. For example, the sensor component 714 may detect the open/close state of the terminal 700, relative positioning of components, e.g., the display and the keypad of the terminal 700, a change in position of the terminal 700 or a component of the terminal 700, a presence or absence of user contact with the terminal 700, an orientation or an acceleration/deceleration of the terminal 700, and a change in temperature of the terminal 700. The sensor component 714 may include a proximity sensor configured to detect the presence of nearby objects without any physical contact. The sensor component 714 may also include a light sensor, such as a CMOS or CCD image sensor, for use in imaging applications. In some embodiments, the sensor component 714 may also include an acceleration sensor, a gyroscope sensor, a magnetic sensor, a pressure sensor or a temperature sensor.

The communication component 716 is configured to facilitate communication, wired or wirelessly, between the terminal 700 and other devices. The terminal 700 may access a wireless network based on a communication standard, such as WiFi, 2G or 3G, or a combination thereof. In one exemplary embodiment, the communication component 716 receives a broadcast signal or broadcast associated information from an external broadcast management system via a broadcast channel. In one exemplary embodiment, the communication component 716 further includes a near field communication (NFC) module to facilitate short-range communication. For example, the NFC module may be implemented based on a radio frequency identification (RFID) technology, an infrared data association (IrDA) technology, an ultra-wideband (UWB) technology, a Bluetooth (BT) technology, and other technologies.

In an exemplary embodiment, the terminal 700 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors, or other electronic elements, for implementing the above methods for executing the BFR process.

In an exemplary embodiment, there is also provided a non-transitory computer-readable storage medium including instructions, such as the memory 704, executable by the processor 720 in the terminal 700, for performing the above-described methods. For example, the non-transitory computer-readable storage medium may be a ROM, a RAM, a CD-ROM, a magnetic tape, a floppy disc, an optical data storage device, and the like.

Figure 8:
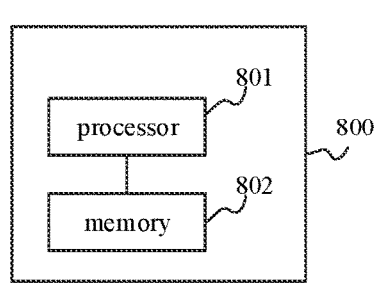
FIG. 8 is a block diagram illustrating a base station according to an exemplary embodiment.

FIG. 8 is a structural schematic diagram of a base station according to an embodiment of the present invention. The base station 800 may have relatively large differences due to different configurations or performance, and may include one or more processors 801 (central processing units, CPU) and one or more memories 802. At least one instruction is stored in the memory 802, and the at least one instruction is loaded and executed by the processor 801 to implement the methods according to the above method embodiments. Of course, the base station may also have components such as a wired or wireless network interface, a keyboard, an input and output interface for input and output, and the base station may also include other components for implementing functions of the apparatus, which will not be repeated here.

The embodiment of the present invention also provides a computer-readable storage medium, which is applied to a terminal. At least one instruction, at least one program, a set of codes or instructions are stored in the computer-readable storage medium, and are loaded and executed by the processor to implement the operations performed by the terminal in the method for executing the BFR process in the above embodiments.

After considering the specification and practicing the disclosure herein, those skilled in the art will easily think of other embodiments of the present disclosure. This application is intended to cover any variations, uses, or adaptive changes of the present disclosure which follow the general principles of the present disclosure and include common knowledge or conventional technical means in the technical field that are not disclosed by the present disclosure. The specification and the embodiments are to be regarded as exemplary only, and the true scope and spirit of the present disclosure are pointed out by the following claims.

It should be understood that the present disclosure is not limited to the precise structure that has been described above and illustrated in the drawings, and various modifications and changes may be made without departing from its scope.

What is claimed is:

1. A method for executing a beam failure recovery (BFR) process, applicable to a terminal, comprising:
    receiving a delay instruction sent by a base station, in which the delay instruction is configured to instruct a mechanism for executing a beam failure recovery (BFR) process is to operate as a mechanism for delaying the execution of the BFR process when the BFR process is triggered in an inactive state of discontinuous reception (DRX);
    configuring the mechanism for executing the BFR process of the terminal as the mechanism for delaying the execution of the BFR process when the BFR process is triggered in the inactive state of the DRX based on the delay instruction; and
    delaying the execution of the BFR process when the BFR process is triggered in the inactive state of the DRX.

2. The method of claim 1, wherein delaying the execution of the BFR process comprises:
    determining a first timing when the DRX switches from the inactive state to an active state, and determining a second timing before the first timing based on the first timing, an interval between the first timing and the second timing being a specified duration; and
    delaying the execution of the BFR process to the second timing.

3. The method of claim 2, wherein before determining the first timing when the DRX switches from the inactive state to the active state, the method further comprising:
    receiving an interval configuration instruction sent by the base station, and obtaining the specified duration from the interval configuration instruction.

4. The method of claim 2, wherein before delaying the execution of the BFR process to the second timing, the method further comprising:
    when an uplink scheduling request (SR) is not triggered before the second timing, executing a step of delaying the execution of the BFR process to the second timing; and
    when the SR is triggered before the second timing, executing the BFR process immediately.

5. The method of claim 2, wherein before delaying the execution of the BFR process to the second timing, the method further comprising:
    when a random access process is not triggered before the second timing, executing a step of delaying the execution of the BFR process to the second timing; and
    when the random access process is triggered before the second timing, executing the BFR process immediately.

6. The method of claim 1, wherein before delaying the execution of the BFR process, the method further comprising:
    detecting whether the terminal is in a long-period inactive state currently; and
    executing a step of delaying the execution of the BFR process when the terminal is in the long-period inactive state currently.

7. The method of claim 6, wherein before detecting whether the terminal is in the long-period inactive state currently, the method further comprising:
    receiving a condition execution instruction sent by the base station, in which the condition execution instruction is configured to instruct the terminal to detect whether it is in the long-period inactive state currently.

8. The method of claim 1, wherein before determining whether the delay instruction sent by the base station is received, the method further comprising:
    sending a delay request to the base station, in which the delay request is configured to request the base station to configure the mechanism for executing the BFR process of the terminal as the mechanism for delaying the execution of the BFR process when the BFR process is triggered in the inactive state of the DRX.

9. The method of claim 1, wherein the delay instruction is configured by the base station for a main cell group (MCG) to the terminal, and/or is configured by the base station for a secondary cell group (SCG) to the terminal.

10. A method for executing a beam failure recovery (BFR) process, applicable to a base station, comprising:
    receiving a delay request sent by a terminal, in which the delay request is configured to request the base station to configure a mechanism for executing a beam failure recovery (BFR) process of the terminal as a mechanism for delaying the execution of the BFR process when the BFR process is triggered in an inactive state of discontinuous reception (DRX); and
    sending a delay instruction to the terminal based on the delay request, in which the delay instruction is configured to instruct the terminal to configure the mechanism for executing the BFR process as the mechanism for delaying the execution of the BFR process when the BFR process is triggered in the inactive state of the DRX.

11. The method of claim 10, wherein the delay request carries current network auxiliary information of the terminal;
    wherein sending the delay instruction to the terminal based on the delay request comprises:
    judging whether the terminal has a delay-sensitive service currently based on the network auxiliary information, in which the delay-sensitive service is a service whose delay requirement is lower than a preset duration; and
    sending the delay instruction to the terminal when the terminal does not have the delay-sensitive service currently.

12. The method of claim 10, wherein the method further comprises:
    sending an interval configuration instruction to the terminal, in which the interval configuration instruction carries a specified duration, the specified duration is an interval between a first timing when the DRX for the terminal switches from the inactive state to an active state and a second timing when the BFR process is executed, the second timing being before the first timing.

13. The method of claim 10, wherein the method further comprises:
  sending a condition execution instruction to the terminal, in which the condition execution instruction is configured to instruct to detect whether the terminal is in a long-period inactive state currently.

14. A base station comprising:
  a processor; and
  a memory for storing instructions executable by the processor;
  wherein the processor is configured to perform the method for executing the BFR process according to claim 10.

15. A terminal comprising:
  a processor; and
  a memory for storing instructions executable by the processor;
  wherein the processor is configured to:
  receive a delay instruction sent by a base station, in which the delay instruction is configured to instruct that a mechanism for executing a beam failure recovery (BFR) process is configured as a mechanism for delaying the execution of the BFR process when the BFR process is triggered in an inactive state of discontinuous reception (DRX);
  configure the mechanism for executing the BFR process of the terminal as the mechanism for delaying the execution of the BFR process when the BFR process is triggered in the inactive state of the DRX based on the delay instruction; and
  delay the execution of the BFR process when the BFR process is triggered in the inactive state of the DRX.

16. The terminal of claim 15, wherein the processor is further configured to:
  determine a first timing when the DRX switches from the inactive state to an active state, and determining a second timing before the first timing based on the first timing, an interval between the first timing and the second timing being a specified duration; and
  delay the execution of the BFR process to the second timing.

17. The terminal of claim 16, wherein the processor is further configured to:
  receive an interval configuration instruction sent by the base station, and obtaining the specified duration from the interval configuration instruction.

18. The terminal of claim 16, wherein the processor is further configured to:
  when an uplink scheduling request (SR) is not triggered before the second timing, execute a step of delaying the execution of the BFR process to the second timing; and
  when the SR is triggered before the second timing, execute the BFR process immediately; or
  when a random access process is not triggered before the second timing, execute a step of delaying the execution of the BFR process to the second timing; and
  when the random access process is triggered before the second timing, execute the BFR process immediately.

19. The terminal of claim 15, wherein the processor is further configured to:
  receive a condition execution instruction sent by the base station, in which the condition execution instruction is configured to instruct the terminal to detect whether it is in a long-period inactive state currently;
  detect whether the terminal is in the long-period inactive state currently; and
  execute a step of delaying the execution of the BFR process when the terminal is in the long-period inactive state currently.

20. The terminal of claim 15, wherein the processor is further configured to:
  send a delay request to the base station, in which the delay request is configured to request the base station to configure the mechanism for executing the BFR process of the terminal as the mechanism for delaying the execution of the BFR process when the BFR process is triggered in the inactive state of the DRX.

* * * * *